US 11,356,816 B2

(12) United States Patent
Zhang et al.

(10) Patent No.: US 11,356,816 B2
(45) Date of Patent: Jun. 7, 2022

(54) VEHICLE CLUSTERING METHOD BASED ON LINK RELIABILITY AND STABILITY

(71) Applicant: Nanjing University of Posts and Telecommunications, Nanjing (CN)

(72) Inventors: Dengyin Zhang, Nanjing (CN); Min Zhang, Nanjing (CN); Fei Ding, Nanjing (CN); Yongjun Li, Nanjing (CN); Nianqi Zhang, Nanjing (CN)

(73) Assignee: Nanjing University of Posts and Telecommunications, Nanjing (CN)

( * ) Notice: Subject to any disclaimer, the term of this patent is extended or adjusted under 35 U.S.C. 154(b) by 0 days.

(21) Appl. No.: 17/165,887

(22) Filed: Feb. 2, 2021

(65) Prior Publication Data

US 2021/0160664 A1 May 27, 2021

Related U.S. Application Data

(63) Continuation-in-part of application No. PCT/CN2020/110738, filed on Aug. 24, 2020.

(30) Foreign Application Priority Data

Oct. 29, 2019 (CN) .......................... 201911036660.4

(51) Int. Cl.
H04W 4/08 (2009.01)
H04W 4/46 (2018.01)
H04W 24/08 (2009.01)
(52) U.S. Cl.
CPC ............... *H04W 4/08* (2013.01); *H04W 4/46* (2018.02); *H04W 24/08* (2013.01)

(58) Field of Classification Search
CPC .......... H04W 24/08; H04W 4/46; H04W 4/08
See application file for complete search history.

(56) References Cited

U.S. PATENT DOCUMENTS

| 10,921,823 | B2* | 2/2021 | Miller, Jr. ............. H04W 12/10 |
| 2016/0150451 | A1* | 5/2016 | Barreto De Miranda Sargento .... H04W 36/30 370/332 |
| 2016/0216130 | A1* | 7/2016 | Abramson ......... G01C 21/3484 |
| 2019/0174286 | A1* | 6/2019 | Guo .................. H04W 72/0486 |

(Continued)

FOREIGN PATENT DOCUMENTS

| CN | 105245563 A | 1/2016 |
| CN | 107071843 A | 8/2017 |

(Continued)

OTHER PUBLICATIONS

Iternation Search Report of PCT/CN2020/110738, dated Nov. 27, 2020.

(Continued)

*Primary Examiner* — Ajay Cattungal

(57) ABSTRACT

A vehicle clustering method includes: acquiring vehicle dynamic information, the vehicle dynamic information including vehicle positions and vehicle speeds; clustering vehicles based on the vehicle dynamic information; calculating, based on the vehicle dynamic information, a link reliability and a link stability of the vehicles in a cluster; calculating, based on the link reliability and the link stability, a selection priority index for a cluster head; and selecting a vehicle with a largest selection priority index in the cluster as a cluster head.

6 Claims, 2 Drawing Sheets

(56) References Cited

U.S. PATENT DOCUMENTS

| | | | | |
|---|---|---|---|---|
| 2020/0125117 A1* | 4/2020 | Switkes | ............... | H04W 4/029 |
| 2020/0393850 A1* | 12/2020 | Jornod | ................... | H04L 67/30 |
| 2021/0150458 A1* | 5/2021 | Robinson | ............ | G08G 5/0065 |

FOREIGN PATENT DOCUMENTS

| | | | |
|---|---|---|---|
| CN | 109121097 A | 1/2019 | |
| CN | 110855563 A | 2/2020 | |

OTHER PUBLICATIONS

Zhang, Dengyin et al. "Survey of Connectivity for 5G-Vehicular Ad Hoc Networks", Journal of Nanjing University of Posts and Telecommunications (Natural Science), Feb. 28, 2018, entire document.
Ericsson. "Clustering and Cluster Head Election Schemes for In-Coverage and Out-of-Coverage UEs", 3GPP TSG-RAN WG1 Meeting #95, R1-1813645, Nov. 16, 2018, entire document.

\* cited by examiner

VEHICLE CLUSTERING METHOD BASED ON LINK RELIABILITY AND STABILITY

CROSS-REFERENCE TO RELAYED APPLICATIONS

This application is a continuation-in-part of International Patent Application No. PCT/CN2020/110738 with an international filing date of Aug. 24, 2020, designating the United States, now pending, and further claims foreign priority benefits to Chinese Patent Application No. 201911036660.4 filed on Oct. 29, 2019. The contents of all of the aforementioned applications, including any intervening amendments thereto, are incorporated herein by reference. Inquiries from the public to applicants or assignees concerning this document or the related applications should be directed to: Matthias Scholl PC., Attn.: Dr. Matthias Scholl Esq., 245 First Street, 18th Floor, Cambridge, Mass. 02142.

BACKGROUND

The disclosure relates to the technical field of transmission of information in the Internet of Vehicles, and more particularly to a vehicle clustering method based on link reliability and stability.

In the Internet of Vehicles, dedicated short range communication (DSRC) is conventionally used for information exchange. Vehicles need to periodically report their traveling information to the base station. The interaction therebetween is frequent although the amount of data is small. This, to a certain extent, causes network congestion, which will adversely affect the connectivity of the Internet of Vehicles and the real-time performance of information.

SUMMARY

The disclosure provides a vehicle clustering method based on link reliability and stability, the method comprising:
  acquiring vehicle dynamic information, the vehicle dynamic information comprising vehicle positions and vehicle speeds;
  clustering vehicles based on the vehicle dynamic information;
  calculating, based on the vehicle dynamic information, a link reliability and a link stability of the vehicles in a cluster;
  calculating, based on the link reliability and the link stability, a selection priority index for a cluster head; and
  selecting a vehicle with a largest selection priority index in the cluster as a cluster head.

In a class of this embodiment, clustering vehicles based on the vehicle dynamic information comprises:
  initially clustering the vehicles based on the vehicle positions to obtain an initial cluster;
  determining, based on the vehicle speeds, a joining factor for each vehicle in the initial cluster; and
  judging whether the joining factor of each vehicle is greater than a set threshold; if the joining factor of each vehicle is greater than the set threshold, removing vehicles with joining factors greater than the preset threshold.

In a class of this embodiment, the link reliability of the vehicles in the cluster is calculated by:

$$r_i = \frac{1}{c_i} \sum_{j=1, j \neq i}^{c_i} r_{i,j}; \text{ where:}$$

$$c_i = \text{count } \{D_{i,j} \leq R\};$$

$$D_{i,j} = \sqrt{(x_i - x_j)^2 + (y_i - y_j)^2},$$

$$r_{i,j} = \int_t^{t+T_{i,j}} f(t)dt, T_{i,j} > 0;$$

$$T_{i,j} = \begin{cases} \frac{R - D_{i,j}}{|v_i - v_j|}, (x_i > x_j \text{ and } v_i > v_j) \text{ or } (x_i < x_j \text{ and } v_i < v_j) \\ \frac{R + D_{i,j}}{|v_i - v_j|}, (x_i > x_j \text{ and } v_i < v_j) \text{ or } (x_i < x_j \text{ and } v_i > v_j) \end{cases};$$

$$f(t) = \frac{1}{\sigma_{i,j}\sqrt{2\pi}} * e^{\frac{(t-\mu_{i,j})^2}{2\sigma_{i,j}^2}};$$

$$\sigma_{i,j}^2 = \sigma_i^2 + \sigma_j^2;$$

$$\mu_{i,j} = |\mu_i - \mu_j|;$$

where, $r_i$ is the link reliability of a vehicle $u_i$, $c_i$ is a number of neighboring vehicles of the vehicle $u_i$, $D_{i,j}$ is a physical distance between the vehicle $u_i$ and a vehicle $u_j$, R is a device-to-device (D2D) communication distance between the vehicles, $(x_i, y_i)$ is a vehicle location of the vehicle $u_i$, $(x_j, y_j)$ is a vehicle location of the vehicle $u_j$, $x_i$ is a coordinate of the vehicle $u_i$ along its traveling direction, $y_i$ is a coordinate of the vehicle $u_i$ perpendicular to its traveling direction, $x_j$ is a coordinate of the vehicle $u_j$ along its traveling direction, $y_j$ is a coordinate of the vehicle $u_j$ perpendicular to its traveling direction, $r_{i,j}$ is the link reliability of the vehicle $u_i$ relative to the vehicle $u_j$, $T_{i,j}$ is a communication time between the vehicle $u_i$ and the vehicle $u_j$, $f(t)$ is a probability density function of the communication time between the vehicle $u_i$ and the vehicle $u_j$, t is the time, $v_i$ is a vehicle speed of the vehicle $u_i$, $v_j$ is a vehicle speed of the vehicle $u_j$, $\sigma_{i,j}^2$ is a variance of the relative speed of the vehicle $u_i$ relative to the vehicle $u_j$, $\sigma_i^2$ is a variance of the vehicle speed of the vehicle $u_i$, $\sigma_j^2$ is a variance of the vehicle speed of the vehicle $u_j$, $\mu_{i,j}$ is an average value of the relative speed of the vehicle $u_i$ relative to the vehicle $u_j$, $\mu_i$ is an average value of the vehicle speed of the vehicle $u_i$, and $\mu_j$ is an average value of the vehicle speed of the vehicle $u_j$.

In a class of this embodiment, the link stability of the vehicles in the cluster is calculated by:

$$s_i = \frac{1}{2v_{ar\_i}} + \frac{c_i}{2k_m}; \text{ where:}$$

$$v_{ar\_i} = \frac{1}{k_m} \sum_{j=1}^{k_m} |v_i - v_j|;$$

$$c_i = \text{count } \{D_{i,j} \leq R\};$$

$$D_{i,j} = \sqrt{(x_i - x_j)^2 + (y_i - y_j)^2};$$

where, $s_i$ is a link stability of the vehicle $u_i$, $v_{ar\_i}$ is a relative speed of the vehicle $u_i$ in the cluster, $c_i$ is a number of neighboring vehicles of the vehicle $u_i$, $k_m$ is a total number of the vehicles, $v_i$ is a vehicle speed of the vehicle $u_i$, $v_j$ is a vehicle speed of the vehicle $u_j$, $D_{i,j}$ is a physical distance between the vehicle $u_i$ and the vehicle $u_j$, R is a D2D communication distance between the vehicles, $(x_i, y_i)$ is a vehicle location of the vehicle $u_i$, $(x_j, y_j)$ is a vehicle location of the vehicle $u_j$, $x_i$ is a coordinate of the vehicle $u_i$ along its traveling direction, $y_i$ is a coordinate of the vehicle $u_i$ perpendicular to its traveling direction, $x_j$ is a coordinate of the vehicle $u_j$ along its traveling direction, $y_j$ is a coordinate of the vehicle $u_j$ perpendicular to its traveling direction.

In a class of this embodiment, the selection priority index for a cluster head is calculated by:

$$\lambda_i = \alpha r_i + \beta s_i;$$

where, $\lambda_i$ is the selection priority index for the cluster head of the vehicle $u_i$, both $\alpha$ and $\beta$ are weighted coefficients, $r_i$ is the link reliability of the vehicle $u_i$, and $s_i$ is the link stability of the vehicle $u_i$.

In a class of this embodiment, the method further comprises:

selecting a vehicle, with a second largest selection priority index, in the cluster as a backup cluster head.

In a class of this embodiment, the method further comprises:

receiving, by the cluster head, traffic safety information transmitted by a base station and broadcasting the traffic safety information to other vehicles in the cluster; and receiving, by the cluster head, vehicle traveling information transmitted by other vehicles in the cluster and transmitting the vehicle traveling information to the base station, the traffic safety information comprising road conditions ahead, safety information ahead, emergency situations, or a combination thereof, the vehicle traveling information comprising current speed, motion track, current position, or a combination thereof.

The disclosure further provides a vehicle clustering system based on link reliability and stability, the system comprising:

an acquisition module used for acquiring vehicle dynamic information, the vehicle dynamic information comprising vehicle positions and vehicle speeds;

a clustering module used for clustering vehicles based on the vehicle dynamic information;

a link reliability and link stability determination module used for calculating, based on the vehicle dynamic information, the link reliability and link stability of the vehicles in a cluster;

a selection priority index determination module used for calculating, based on the link reliability and link stability, a selection priority index for a cluster head; and a cluster head determination module used for selecting a vehicle, with the largest selection priority index, in the cluster as a cluster head.

In a class of this embodiment, the clustering module comprises:

an initial clustering unit used for initially clustering the vehicles based on the vehicle position to obtain an initial cluster;

a joining factor determination unit used for determining, based on the vehicle speed, a joining factor for each vehicle in the initial cluster;

a judgement unit used for judging whether the joining factor of each vehicle is greater than a set threshold, and if the joining factor of each vehicle is greater than the set threshold, removing vehicles with joining factors greater than the preset threshold.

In a class of this embodiment, the link reliability of the vehicles in the cluster is calculated by:

$$r_i = \frac{1}{c_i} \sum_{j=1, j\neq 1}^{c_i} r_{i,j}; \text{ where:}$$

$$c_i = \text{count } \{D_{i,j} \leq R\};$$

$$D_{i,j} = \sqrt{(x_i - x_j)^2 + (y_i - y_j)^2},$$

$$r_{i,j} = \int_t^{t+T_{i,j}} f(t)dt, T_{i,j} > 0;$$

$$T_{i,j} = \begin{cases} \frac{R - D_{i,j}}{|v_i - v_j|}, & (x_i > x_j \text{ and } v_i > v_j) \text{ or } (x_i < x_j \text{ and } v_i < v_j) \\ \frac{R + D_{i,j}}{|v_i - v_j|}, & (x_i > x_j \text{ and } v_i < v_j) \text{ or } (x_i < x_j \text{ and } v_i > v_j) \end{cases};$$

$$f(t) = \frac{1}{\sigma_{i,j}\sqrt{2\pi}} * e^{-\frac{(t-\mu_{i,j})^2}{2\sigma_{i,j}^2}};$$

$$\sigma_{i,j}^2 = \sigma_i^2 + \sigma_j^2;$$

$$\mu_{i,j} = |\mu_i - \mu_j|;$$

where, $r_i$ is the link reliability of a vehicle $u_i$, $c_i$ is a number of neighboring vehicles of the vehicle $u_i$, $D_{i,j}$ is a physical distance between the vehicle $u_i$ and a vehicle $u_j$, R is a device-to-device (D2D) communication distance between the vehicles, $(x_i, y_i)$ is a vehicle location of the vehicle $u_i$, $(x_j, y_j)$ is a vehicle location of the vehicle $u_j$, $x_i$ is a coordinate of the vehicle $u_i$ along its traveling direction, $y_i$ is a coordinate of the vehicle $u_i$ perpendicular to its traveling direction, $x_j$ is a coordinate of the vehicle $u_j$ along its traveling direction, $y_j$ is a coordinate of the vehicle $u_j$ perpendicular to its traveling direction, $r_{i,j}$ is the link reliability of the vehicle $u_i$ relative to the vehicle $u_j$, $T_{i,j}$ is a communication time between the vehicle $u_i$ and the vehicle $u_j$, $f(t)$ is a probability density function of the communication time between the vehicle $u_i$ and the vehicle $u_j$, t is the time, $v_i$ is a vehicle speed of the vehicle $u_i$, $v_j$ is a vehicle speed of the vehicle $u_j$, $\sigma_{i,j}^2$ is a variance of the relative speed of the vehicle $u_i$ relative to the vehicle $u_j$, $\sigma_i^2$ is a variance of the vehicle speed of the vehicle $u_i$, $\sigma_j^2$ is a variance of the vehicle speed of the vehicle $u_j$, $\mu_{i,j}$ is an average value of the relative speed of the vehicle $u_i$ relative to the vehicle $u_j$, $\mu_i$ is an average value of the vehicle speed of the vehicle $u_i$, and $\mu_j$ is an average value of the vehicle speed of the vehicle $u_j$.

The following advantages are associated with the method and system of the disclosure. The vehicle clustering method comprises: acquiring vehicle dynamic information; clustering vehicles based on the vehicle dynamic information; calculating, based on the vehicle dynamic information, the link reliability and link stability of the vehicles in a cluster; calculating, based on the link reliability and link stability, a selection priority index for a cluster head; and selecting a vehicle with the largest selection priority index in the cluster as a cluster head. The disclosure considers both the link stability between the cluster head and other vehicles in the cluster and the link reliability between the cluster head and other vehicles in the cluster. Therefore, when the cluster head is selected, both the stability of the cluster head and the reliability of the cluster head are ensured.

DETAILED DESCRIPTION

To further illustrate, embodiments detailing a vehicle clustering method are described below. It should be noted that the following embodiments are intended to describe and not to limit the disclosure.

Figure 1:
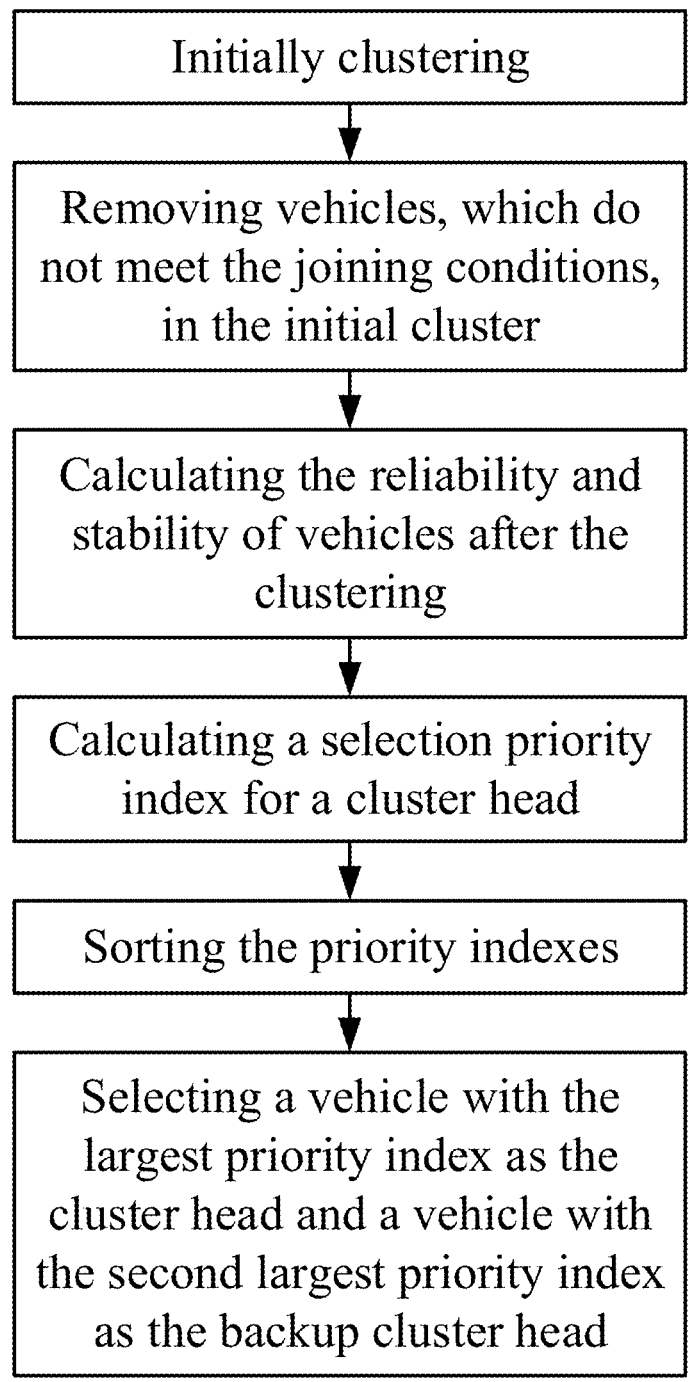
FIG. 1 is a flowchart of a vehicle clustering method according to an embodiment of the disclosure.

FIG. 1 is a flowchart of a vehicle clustering method according to an embodiment of the disclosure. As shown in FIG. 1, the vehicle clustering method based on link reliability and stability is implemented as follows.

In S1, a vehicle u acquires its own dynamic information during the traveling process. The vehicle dynamic information comprises vehicle position $(x_j, y_j)$, vehicle speed $v_i$ and travelling lane $(R_1, R_2 \ldots)$, where $x_i$ is a coordinate of the vehicle $u_i$ along its traveling direction and $y_i$ is a coordinate of the vehicle $u_i$ perpendicular to its traveling direction. The travelling vehicles are clustered initially according to the vehicle position to obtain an initial cluster. It is assumed that there are total N vehicles, denoted by $u_i$, where i=1, 2, ..., N, then the N vehicles are divided into M initial clusters.

In S2, it is assumed that the vehicle speed conforms to the Gaussian distribution, that is, the vehicle $u_i$ obeys $N(\mu_i, \sigma_i^2)$, where $\mu_i$ is an average value of the vehicle speed of the vehicle $u_i$ and $\sigma_i^2$ is a variance of the vehicle speed of the vehicle $u_i$. The average speed $v_{avg\_m}$ of the initial cluster is calculated, where m=1, 2, ..., M.

In S3, a joining factor is determined, specifically:

$$\varphi_i = \left| \frac{\mu_i - v_{avg\_m}}{v_{avg\_m}} \right|;$$

where, $\varphi_i$ is the joining factor for the vehicle $u_i$.

If $\varphi_i > 0.5$, the vehicle $u_i$ is removed from the initial cluster, otherwise the vehicle $u_i$ is kept in its cluster.

In S4, the link reliability of the vehicles in the cluster is calculated, specifically in the following order:

(1) It is assumed that the device-to-device (D2D) communication distance between vehicles is R, there is another vehicle $u_j$ in the cluster, obeying $N(\mu_j, \sigma_j^2)$, the position of the vehicle $u_j$ along the road direction, position of the vehicle $u_j$ perpendicular to the road direction, vehicle speed of the vehicle $u_j$ and average speed of the vehicle $u_j$ are denoted by $x_j$, $y_j$, $v_j$ and $\mu_j$, respectively, and $\sigma_j^2$ is a variance of the vehicle speed of the vehicle $u_j$.

(2) The physical distance $D_{i,j}$ between the vehicle $u_i$ and the vehicle $u_j$ is calculated by:

$$D_{i,j} = \sqrt{(x_i - x_j)^2 + (y_i - y_j)^2}.$$

(3) The communication time $T_{i,j}$ between the vehicle $u_i$ and the vehicle $u_j$ is calculated by:

$$T_{i,j} = \begin{cases} \frac{R - D_{i,j}}{|v_i - v_j|}, & (x_i > x_j \text{ and } v_i > v_j) \text{ or } (x_i < x_j \text{ and } v_i < v_j) \\ \frac{R + D_{i,j}}{|v_i - v_j|}, & (x_i > x_j \text{ and } v_i < v_j) \text{ or } (x_i < x_j \text{ and } v_i > v_j) \end{cases}.$$

(4) The probability density function $f(t)$ of the communication time between the vehicle $u_i$ and the vehicle $u_j$ is calculated by:

$$f(t) = \frac{1}{\sigma_{i,j}\sqrt{2\pi}} * e^{\frac{(t - \mu_{i,j})^2}{2\sigma_{i,j}^2}};$$

where, $\sigma_{i,j}^2 = \sigma_i^2 + \sigma_j^2$, $\mu_{i,j} = |\mu_i - \mu_j|$, $\sigma_{i,j}^2$ is a variance of the relative speed of the vehicle $u_i$ relative to the vehicle $u_j$, e is a natural constant, t is the time, and $\mu_{i,j}$ is an average value of the relative speed of the vehicle $u_i$ relative to the vehicle $u_j$.

(5) The link reliability $r_{i,j}$ of the vehicle $u_i$ relative to the vehicle $u_j$ is calculated by:

$$r_{i,j} = \int_t^{t+T_{i,j}} f(t) dt, T_{i,j} > 0.$$

(6) The number $c_i$ of neighboring vehicles of the vehicle $u_i$ is calculated by:

$$c_i = \text{count}\{D_{i,j} \leq R\}$$

(7) The link reliability $r_i$ of the vehicle $u_i$ is calculated by:

$$r_i = \frac{1}{c_i} \sum_{j=1, j \neq i}^{c_i} r_{i,j}.$$

In S5, the link stability of the vehicles in the cluster is calculated, specifically in the following order:

(1) It is assumed that there are total $k_m$ vehicles in the initial cluster after the clustering step, where m=1, 2, ..., M, then the relative speed of the vehicle $u_i$ in the cluster is defined by $v_{ar\_i}$, specifically:

$$v_{ar\_i} = \frac{1}{k_m} \sum_{j=1}^{k_m} |v_i - v_j|.$$

(2) The link stability $s_i$ of the vehicle $u_i$ in the cluster is calculated by:

$$s_i = \frac{1}{2v_{ar\_i}} + \frac{c_i}{2k_m}.$$

In S6, the selection priority index for a cluster head $\lambda_i$ is established, specifically:

$$\lambda_i = \alpha r_i + \beta s_i;$$

where, both $\alpha$ and $\beta$ are weighted coefficients, which may be set according to the actual traffic situations, usually 0.5.

In S7, the selection priority index for a cluster head of the vehicles are sorted from smallest to largest, and a vehicle with the largest selection priority index is selected as the cluster head. Considering the travelling dynamic property of vehicles, a vehicle with the second largest selection priority index is selected as the backup cluster head.

In S8, upon receiving traffic safety information transmitted by a base station, the cluster head broadcasts the traffic safety information to other vehicles in the cluster, and upon receiving the broadcast packet, the other vehicles automatically define their own member nodes.

In S9, D2D communication is used between the member nodes and the cluster head in a cluster, and the member nodes periodically send their own travelling information to the cluster head, comprising current speed, motion track, current position, etc.; and the cluster head sends the received travelling information to the base station.

Figure 2:
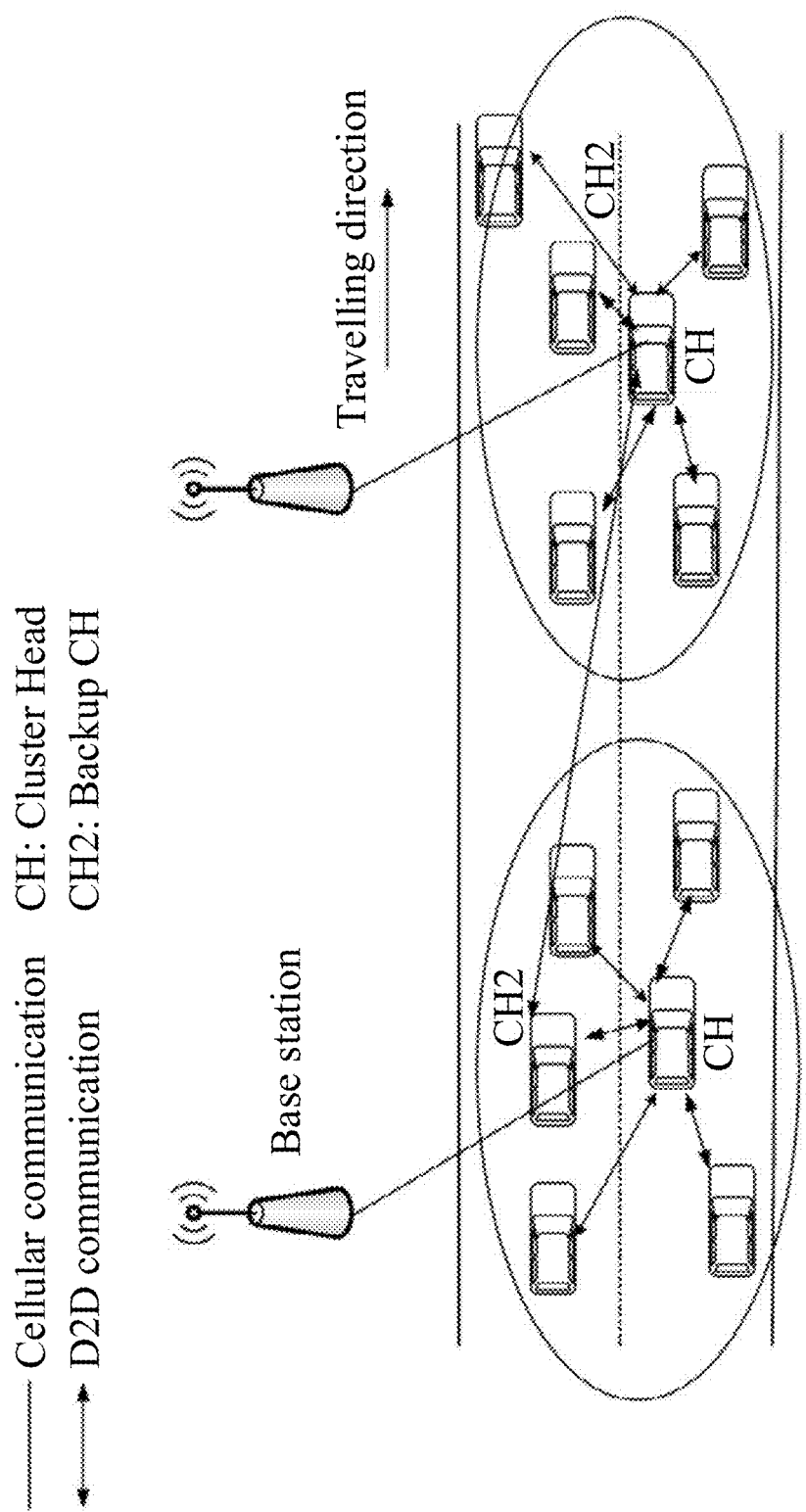
FIG. 2 is a schematic diagram of an Internet of Vehicles architecture according to an embodiment of the disclosure.

As shown in FIG. 2, CH is the cluster head, CH2 is the backup cluster head, and other vehicles are the member nodes. Cellular communication is used between the cluster head and the base station, and D2D communication is used between the cluster head and the member nodes. The member nodes periodically send traveling information such as current speed, motion track and current position to the cluster head. The cluster head collects and maintains such information and reports it to the base station periodically, and also, based on the information received from the base station, broadcasts data to the member nodes, comprising information about road conditions ahead, safety information, emergency situations, etc., so as to assist the safe travelling and reduce the incidence of traffic accidents. Since the data traffic in the D2D communication method does not pass through the base station and the core network, the load of the operator's cellular network can be well optimized. When the cluster head fails, the backup cluster head is immediately put into use, thus ensuring the reliability of real-time communication in the Internet of Vehicles.

The disclosure further provides a vehicle clustering system based on link reliability and stability, the system comprising:

an acquisition module used for acquiring vehicle dynamic information, the vehicle dynamic information comprising vehicle position and vehicle speed;

a clustering module used for clustering vehicles based on the vehicle dynamic information;

a link reliability and link stability determination module used for calculating, based on the vehicle dynamic information, the link reliability and link stability of the vehicles in a cluster;

a selection priority index determination module used for calculating, based on the link reliability and link stability, a selection priority index for a cluster head; and a cluster head determination module used for selecting a vehicle, with the largest selection priority index, in the cluster as a cluster head.

In certain embodiments, the clustering module in the disclosure comprises:

an initial clustering unit used for initially clustering the vehicles based on the vehicle position to obtain an initial cluster;

a joining factor determination unit used for determining, based on the vehicle speed, a joining factor for each vehicle in the initial cluster;

a judgement unit used for judging whether the joining factor of each vehicle is greater than a set threshold, and if the joining factor of each vehicle is greater than the set threshold, removing vehicles with joining factors greater than the preset threshold.

In certain embodiments, the link reliability of the vehicles in the cluster is calculated by:

$$r_i = \frac{1}{c_i} \sum_{j=1, j \neq 1}^{c_i} r_{i,j}; \text{where}$$

$$c_i = \text{count } \{D_{i,j} \leq R\},$$

$$D_{i,j} = \sqrt{(x_i - x_j)^2 + (y_i - y_j)^2},$$

$$r_{i,j} = \int_t^{t+T_{i,j}} f(t)dt, T_{i,j} > 0,$$

$$T_{i,j} = \begin{cases} \frac{R - D_{i,j}}{|v_i - v_j|}, (x_i > x_j \text{ and } v_i > v_j) \text{ or } (x_i < x_j \text{ and } v_i < v_j) \\ \frac{R + D_{i,j}}{|v_i - v_j|}, (x_i > x_j \text{ and } v_i < v_j) \text{ or } (x_i < x_j \text{ and } v_i > v_j) \end{cases},$$

$$f(t) = \frac{1}{\sigma_{i,j}\sqrt{2\pi}} * e^{\frac{(t-\mu_{i,j})^2}{2\sigma_{i,j}^2}},$$

$$\sigma_{i,j}^2 = \sigma_i^2 + \sigma_j^2,$$

$$\mu_{i,j} = |\mu_i - \mu_j|;$$

where, $r_i$ is the link reliability of a vehicle $u_i$, $c_i$ is the number of neighboring vehicles of the vehicle $u_i$, $D_{i,j}$ is a physical distance between the vehicle $u_i$ and a vehicle $u_j$, R is the D2D communication distance between the vehicles, $(x_i, y_i)$ is a vehicle location of the vehicle $u_i$, $(x_j, y_j)$ is a vehicle location of the vehicle $u_j$, $x_i$ is a coordinate of the vehicle $u_i$ along its traveling direction, $y_i$ is a coordinate of the vehicle $u_i$ perpendicular to its traveling direction, $x_j$ is a coordinate of the vehicle $u_j$ along its traveling direction, $y_j$ is a coordinate of the vehicle $u_j$ perpendicular to its traveling direction, $r_{i,j}$ is the link reliability of the vehicle $u_i$ relative to the vehicle $u_j$, $T_{i,j}$ is the communication time between the vehicle $u_i$ and the vehicle $u_j$, $f(t)$ is the probability density function of the communication time between the vehicle $u_i$ and the vehicle $u_j$, t is the time, $v_i$ is a vehicle speed of the vehicle $u_i$, $v_j$ is a vehicle speed of the vehicle $u_j$, $\sigma_{i,j}^2$ is a variance of the relative speed of the vehicle $u_i$ relative to the vehicle $u_j$, $\sigma_i^2$ is a variance of the vehicle speed of the vehicle $u_i$, $\sigma_j^2$ is a variance of the vehicle speed of the vehicle $u_j$, $\mu_{i,j}$ is an average value of the relative speed of the vehicle $u_i$ relative to the vehicle $u_j$, $\mu_i$ is an average value of the vehicle speed of the vehicle $u_i$, and $\mu_j$ is an average value of the vehicle speed of the vehicle $u_j$.

In certain embodiments, the link stability of the vehicles in the cluster is calculated by:

$$s_i = \frac{1}{2v_{ar\_i}} + \frac{c_i}{2k_m}; \text{where}$$

$$v_{ar\_i} = \frac{1}{k_m} \sum_{j=1}^{k_m} |v_i - v_j|,$$

$$c_i = \text{count } \{D_{i,j} \leq R\},$$

$$D_{i,j} = \sqrt{(x_i - x_j)^2 + (y_i - y_j)^2};$$

where, $s_i$ is the link stability of the vehicle $u_i$, $v_{ar\_i}$ is the relative speed of the vehicle $u_i$ in the cluster, $c_i$ is the number of neighboring vehicles of the vehicle $u_i$, $k_m$ is a total number of the vehicles, $v_i$ is a vehicle speed of the vehicle $u_i$, $v_j$ is a vehicle speed of the vehicle $u_j$, $D_{i,j}$ is a physical distance between the vehicle $u_i$ and the vehicle $u_j$, R is the D2D communication distance between the vehicles, $(x_i, y_i)$ is a vehicle location of the vehicle $u_i$, $(x_j, y_j)$ is a vehicle location of the vehicle $u_j$, $x_i$ is a coordinate of the vehicle $u_i$ along its traveling direction, $y_i$ is a coordinate of the vehicle $u_i$ perpendicular to its traveling direction, $x_j$ is a coordinate of the vehicle $u_j$ along its traveling direction, $y_j$ is a coordinate of the vehicle $u_j$ perpendicular to its traveling direction.

In certain embodiments, the selection priority index for a cluster head is calculated by:

$$\lambda_i = \alpha r_i + \beta s_i;$$

where, $\lambda_i$ is the selection priority index for a cluster head of the vehicle $u_i$, both $\alpha$ and $\beta$ are weighted coefficients, $r_i$ is the link reliability of the vehicle $u_i$, and $s_i$ is the link stability of the vehicle $u_i$.

In certain embodiments, the system in the disclosure further comprises:

a backup cluster head determination module used for selecting a vehicle, with the second largest selection priority index, in the cluster as a backup cluster head.

In certain embodiments, the system in the disclosure further comprises:

a broadcasting module used for, by the cluster head, receiving traffic safety information transmitted by a base station and broadcasting the traffic safety information to other vehicles in the cluster; and an information sending module used for, by the cluster head, receiving vehicle traveling information transmitted by other vehicles in the cluster and transmitting the vehicle traveling information to the base station, the traffic safety information comprising road conditions ahead, safety information ahead, emergency situations, or a combination thereof, the vehicle traveling information comprising current speed, motion track, current position, or a combination thereof.

The solution of the disclosure has the following advantages:

1) In the disclosure, vehicles within a certain distance are clustered by location. When clustering is performed, a joining factor is defined. A vehicle node with a relatively high average relative speed is removed from the cluster, to avoid overall instability which is caused by the inconsistent movement between this vehicle and other vehicles in the cluster. Therefore, the stability of the clustered communication link is improved.

2) When a cluster head is selected, the communication time between the cluster head and other vehicles in the cluster, the number of neighboring vehicles of the cluster head, the link stability between the cluster head and other vehicles in the cluster, and the relative speed of the cluster head and other vehicles in the cluster are all taken into consideration. This ensures not only the stability of the cluster head and also the reliability of the cluster head.

3) In the disclosure, considering that the selected cluster head may fail, a backup cluster head is provided. Once the cluster head fails, the backup cluster head can be immediately put into use, ensuring the high requirements of the Internet of Vehicles on the real-time performance.

4) In the disclosure, the traditional DSRC in the Internet of Vehicles is replaced with D2D-based intra-cluster message transmission in the Internet of Vehicles. Since the data traffic in the D2D communication method does not pass through the base station and core network, the load of the operator's cellular network can be well optimized. This also has the advantages of reliability and high performance.

The various embodiments in this specification have been described in a progressive manner. Each embodiment focuses on the differences from other embodiments. The same or similar parts between the various embodiments can be referred to each other.

It will be obvious to those skilled in the art that changes and modifications may be made, and therefore, the aim in the appended claims is to cover all such changes and modifications.

What is claimed is:

1. A method, comprising:
acquiring vehicle dynamic information, the vehicle dynamic information comprising vehicle positions and vehicle speeds;
clustering vehicles based on the vehicle dynamic information;
calculating, based on the vehicle dynamic information, a link reliability and a link stability of the vehicles in a cluster;
calculating, based on the link reliability and the link stability, a selection priority index for a cluster head; and
selecting a vehicle with a largest selection priority index in the cluster as a cluster head;
wherein the link reliability of the vehicles in the cluster is calculated by:

$$r_i = \frac{1}{c_i} \sum_{j=1, j \neq 1}^{c_i} r_{i,j}; \text{ where:}$$

$$c_i = \text{count } \{D_{i,j} \leq R\};$$

$$D_{i,j} = \sqrt{(x_i - x_j)^2 + (y_i - y_j)^2};$$

$$r_{i,j} = \int_t^{t+T_{i,j}} f(t)dt, T_{i,j} > 0;$$

$$T_{i,j} = \begin{cases} \frac{R - D_{i,j}}{|v_i - v_j|}, (x_i > x_j \text{ and } v_i > v_j) \text{ or } (x_i < x_j \text{ and } v_i < v_j) \\ \frac{R + D_{i,j}}{|v_i - v_j|}, (x_i > x_j \text{ and } v_i < v_j) \text{ or } (x_i < x_j \text{ and } v_i > v_j) \end{cases};$$

$$f(t) = \frac{1}{\sigma_{i,j}\sqrt{2\pi}} * e^{\frac{(t-\mu_{i,j})^2}{2\sigma_{i,j}^2}};$$

$$\sigma_{i,j}^2 = \sigma_i^2 + \sigma_j^2; \text{ and}$$

$$\mu_{i,j} = |\mu_i - \mu_j|;$$

where:
$r_i$ is the link reliability of a vehicle $u_i$; $c_i$ is a number of neighboring vehicles of the vehicle $u_i$; $D_{i,j}$ is a physical distance between the vehicle $u_i$ and a vehicle $u_j$; R is a device-to-device (D2D) communication distance between the vehicles; $(x_i, y_i)$ is a vehicle location of the vehicle $u_i$; $(x_j, y_j)$ is a vehicle location of the vehicle $u_j$; $x_i$ is a coordinate of the vehicle $u_i$ along its traveling direction; $y_i$ is a coordinate of the vehicle $u_i$ perpendicular to its traveling direction; $x_j$ is a coordinate of the vehicle $u_j$ along its traveling direction; $y_j$ is a coordinate of the vehicle $u_j$ perpendicular to its traveling direction; $r_{i,j}$ is the link reliability of the vehicle $u_i$ relative to the vehicle $u_j$; $T_{i,j}$ is a communication time between the vehicle $u_i$ and the vehicle $u_j$; f(t) is a probability density function of the communication time between the vehicle $u_i$ and the vehicle $u_j$; t is a time; $v_i$ is a vehicle speed of the vehicle $u_i$; $v_j$ is a vehicle speed of the vehicle $u_j$; $\sigma_{i,j}^2 \sigma_i^2$ is a variance of the vehicle speed of the vehicle $u_i$; $\sigma_j^2$ is a variance of the vehicle speed of the vehicle $u_j$; $\mu_{i,j}$ is an average value of the relative speed of the vehicle $u_i$ relative to the vehicle $u_j$; $\mu_i$ is an average value of the vehicle speed of the vehicle $u_i$; and $\mu_j$ is an average value of the vehicle speed of the vehicle $u_j$.

2. The method of claim 1, wherein the clustering vehicles based on the vehicle dynamic information comprises:
initially clustering the vehicles based on the vehicle positions to obtain an initial cluster;
determining, based on the vehicle speeds, a joining factor for each vehicle in the initial cluster; and
judging whether the joining factor of each vehicle is greater than a set threshold; if the joining factor of each vehicle is greater than the set threshold, removing vehicles with joining factors greater than the preset threshold.

3. The method of claim 1, wherein the link stability of the vehicles in the cluster is calculated by:

$$s_i = \frac{1}{2v_{ar\_i}} + \frac{c_i}{2k_m}; \text{ where:}$$

$$v_{ar\_i} = \frac{1}{k_m}\sum_{j=1}^{k_m}|v_i - v_j|;$$

$$c_i = \text{count }\{D_{i,j} \le R\};$$

$$D_{i,j} = \sqrt{(x_i - x_j)^2 + (y_i - y_j)^2};$$

where:

$s_i$ is the link stability of a vehicle $u_i$; $v_{ar\_i}$ is a relative speed of the vehicle $u_i$ in the cluster; $c_i$ is a number of neighboring vehicles of the vehicle $u_i$; $k_m$ is a total number of the vehicles; $v_i$ is a vehicle speed of the vehicle $u_i$; $v_j$ is a vehicle speed of the vehicle $u_j$; $D_{i,j}$ is a physical distance between the vehicle $u_i$ and the vehicle $u_j$; R is a device-to-device (D2D) communication distance between the vehicles; $(x_i, y_i)$ is a vehicle location of the vehicle $u_i$; $(x_j, y_j)$ is a vehicle location of the vehicle $u_j$; $x_i$ is a coordinate of the vehicle $u_i$ along its traveling direction; $y_i$ is a coordinate of the vehicle $u_i$ perpendicular to its traveling direction; $x_j$ is a coordinate of the vehicle $u_j$ along its traveling direction; $y_j$ is a coordinate of the vehicle $u_j$ perpendicular to its traveling direction.

4. The method of claim 1, wherein the selection priority index for a cluster head is calculated by:

$$\lambda_i = \alpha r_i + \beta s_i;$$

where, $\lambda_i$ is the selection priority index for the cluster head of the vehicle $u_i$; both $\alpha$ and $\beta$ are weighted coefficients; $r_i$ is the link reliability of a vehicle $u_i$; and $s_i$ is the link stability of the vehicle $u_i$.

5. The method of claim 1, further comprising selecting a vehicle with a second largest selection priority index in the cluster as a backup cluster head.

6. The method of claim 1, further comprising:
receiving, by the cluster head, traffic safety information transmitted by a base station and broadcasting the traffic safety information to other vehicles in the cluster; and
receiving, by the cluster head, vehicle traveling information transmitted by other vehicles in the cluster and transmitting the vehicle traveling information to the base station, the traffic safety information comprising road conditions ahead, safety information ahead, emergency situations, or a combination thereof; and the vehicle traveling information comprising current speed, motion track, current position, or a combination thereof.

* * * * *